April 1, 1952 — C. A. GOOLEY ET AL — 2,591,147
ROTARY TOOTH CLEANER
Filed Aug. 2, 1945 — 3 Sheets-Sheet 1
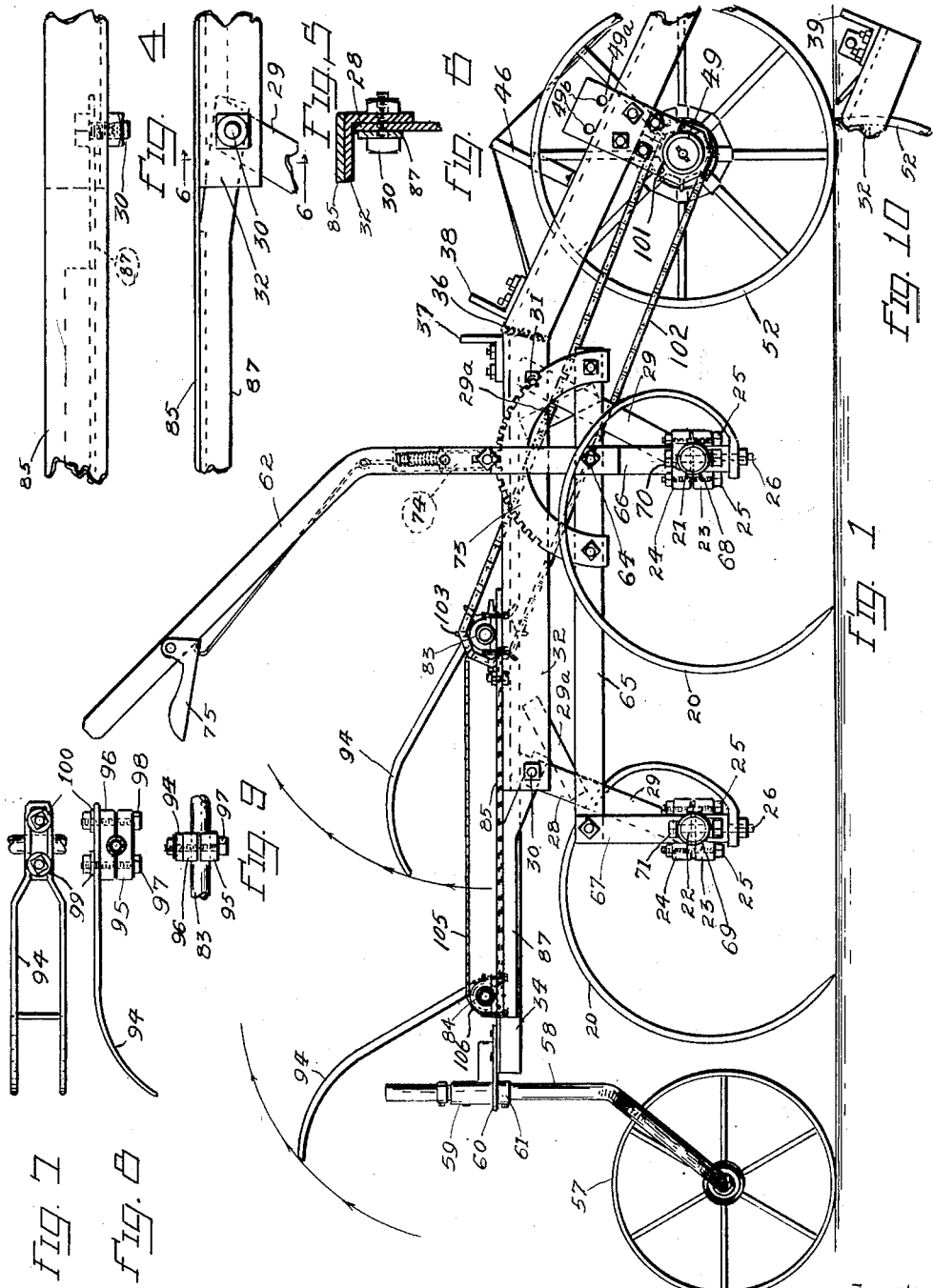
Inventor
EDWARD L. GOOLEY
CLARENCE A. GOOLEY
By Smith & Wells
Attorneys

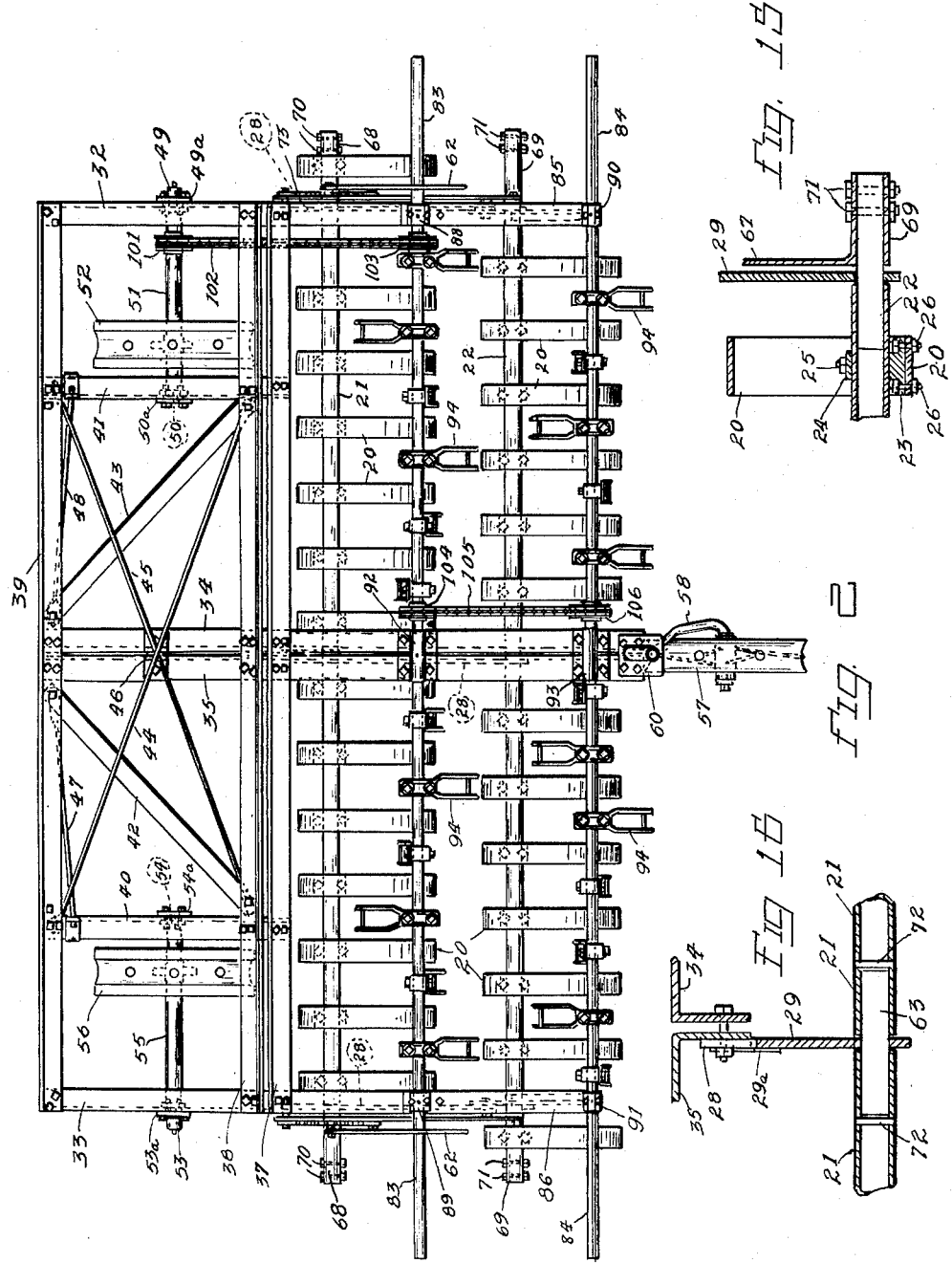

April 1, 1952
C. A. GOOLEY ET AL
2,591,147
ROTARY TOOTH CLEANER
Filed Aug. 2, 1945
3 Sheets-Sheet 3
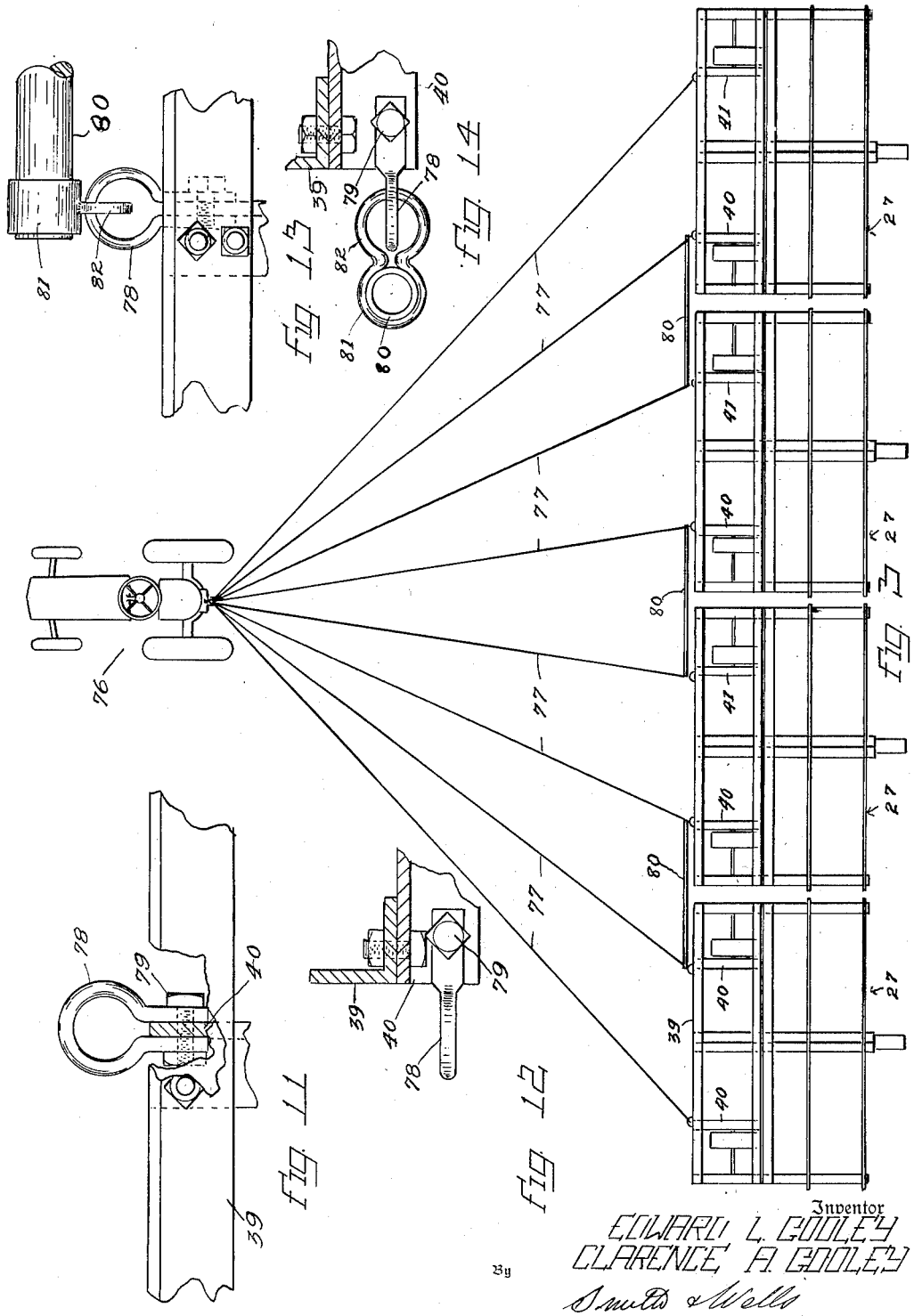
Inventor
EDWARD L. GOOLEY
CLARENCE A. GOOLEY
By
Attorneys

Patented Apr. 1, 1952

2,591,147

UNITED STATES PATENT OFFICE 2,591,147

ROTARY TOOTH CLEANER

Clarence A. Gooley and Edward L. Gooley, Harrington, Wash.

Application August 2, 1945, Serial No. 608,411

3 Claims. (Cl. 97—194)

The present invention relates to the tilling of soil and is particularly directed to improvements in spring tooth harrows. In the use of such devices for tilling soil it has been very difficult to obtain good results for the reasons that they could not be controlled adequately as to depth and were quite subject to fouling by the loose material such as weeds and straw on the surface of the soil being worked. It is the principal purpose of our invention to provide a spring toothed harrow wherein these difficulties are overcome.

It is also a purpose of our invention to provide a novel spring tooth harrow construction wherein the spring teeth are carried on frames that are supported upon wheels in such fashion that they may adapt themselves readily to variations in the contour of the ground.

It is a further purpose of our invention to provide a wheel supported spring toothed harrow wherein several like units may be hitched abreast to a single tractor to till a strip of ground equal in width to the several units without the use of a hitching cart or draw bar.

It is also a purpose of our invention to provide an improved spring tooth harrow wherein the harrow is wheel supported and the wheels, in rolling on the ground, drive forks between the teeth of the harrow in such a direction as to wipe off any accumulating trash or weeds.

Another purpose of the invention is to provide a spring tooth harrow with a minimum of parts in engagement with the ground where they would be quickly worn out in abrasive gravelly soil and would increase the drag.

The nature and advantages of our invention will appear more fully from the following description and the accompanying drawings wherein a preferred form of the invention is shown. It should be understood however, that the drawings and description are illustrative only and are not to be considered as limiting the scope of the invention except insofar as it is limited by the claims.

In the drawings:

Figure 1 is a view in side elevation of a spring tooth harrow embodying my invention;

Figure 2 is a plan view of the harrow;

Figure 3 is a plan view showing a combination of a plurality of harrow units with a single tractor, the showing of the harrows being diagrammatic for the sake of clearness;

Figure 4 is an enlarged fragmentary plan view of a portion of the harrow frame;

Figure 5 is a side view of that portion of the harrow frame shown in Figure 4;

Figure 6 is a sectional view taken vertically through the frame on the line 6—6 of Figure 5;

Figure 7 is a detail view of one of the trash removing forks;

Figure 8 is a view taken at right angles to Figure 7;

Figure 9 is a view of the fork mounting taken at right angles to Figure 8;

Figure 10 is a fragmentary view showing that part of the front end of the harrow that is broken off in Figure 1;

Figures 11 and 12 are fragmentary views partly in section illustrating the mounting of a hitching ring to the harrow frame;

Figures 13 and 14 are fragmentary views partly in section illustrating how spacing bars are mounted between adjacent harrow sections to cooperate with the hitching cables to maintain the harrows in alignment;

Figure 15 is a fragmentary sectional view through one of the end supports for the harrow tooth mounting shafts; and Figure 16 is a fragmentary sectional view illustrating the central mounting of the shafts to the frame of the machine.

Referring now to Figures 1, 2 and 3, these figures illustrate our invention as embodied in a spring tooth harrow. The teeth of the harrow are identified by the numeral 20. They are constructed of flat spring steel bars and formed substantially as shown in Figure 1. These teeth are carried by two hollow shafts 21 and 22 to which they are secured by lower clamping blocks 23—23 and upper clamping blocks 24—24. The blocks are clamped on the shafts by bolts 25 and the teeth are secured to the lower blocks 23 by bolts 26. The teeth on the shaft 22 are usually staggered with respect to the teeth on the shaft 21 so that the soil is well broken up by the teeth. The teeth can be removed or shifted lengthwise of the shafts by loosening the bolts 25 and sliding the blocks along the shafts without loosening the teeth on the lower block.

A frame 27 fabricated of angle iron and suitable braces, carries the shafts 21 and 22 by means of a series of U-shaped suspension bars 28 having openings in the lower ends of the legs 29 in which the shafts can turn. These bars are removably bolted by bolts 30 and 31 to the frame. The frame comprises two end pieces 32 and 33 and two center pieces 34 and 35 of angle iron offset as indicated at 36 in Figure 1. The offset is formed by cutting a notch in the side flanges and bending the top flange and welding the two sections of the side flange to each other at an angle. Two cross pieces 37 and 38 are bolted to the end pieces and the center pieces. These cross pieces are angle irons too. Another angle iron 39 connects the front ends of the angle irons 32, 33, 34 and 35. Two short pieces 40 and 41 of angle iron are spaced inwardly from the end pieces 32 and 33 and are bolted to the angle irons 37, 38 and 39. Two bracing bars 42 and 43 connect the angle irons 38 and 39 between the pieces 40 and 41. Also two tie rods 44 and 45 are secured to the depending flanges of the angle irons 40 and 41 and passed over a pedestal 46 on the center pieces 34 and 35 and two other tie rods 47 and 48 extend from the front ends of the braces 42 and 43 to the angle irons 40 and 41. This construction provides a very rigid front center section for the frame 27 where the heaviest draft strains occur.

The pieces 32 and 41 mount suitable bearings 49 and 50 for an axle 51 on which a wheel 52 is fixed. Likewise the pieces 33 and 40 mount bearings 53 and 54 for an axle 55 on which a wheel 56 is fixed. As shown best in Figure 2 these bearings are carried by plates 49a, 50a, 53a and 54a that are bolted to the flanges of the angle iron pieces. These plates are long enough to provide two sets of mounting holes so that the axles can be lowered with respect to the frame from the position shown in Figure 1. The extra mounting holes are shown at 49b in Figure 1. The wheels 52 and 56 form the front supports for the frame 27. A single rear supporting wheel 57 is provided at the rear ends of the center angle irons 34 and 35. This wheel is journalled upon the lower end of a supporting rod 58. The rod 58 is bent forwardly and then laterally and upwardly to extend through a bearing 59 which is mounted upon a heavy plate 60 that is bolted to the rear ends of the angle irons 34 and 35. A thrust collar 61 is fastened on the rod 58 to bear against the lower surface of the bearing 59. This collar is adjustable vertically to provide a fine adjustment of the depth of the spring teeth. Thus the wheel 57 forms a rear support for the frame at the center. Since the wheel can turn about a vertical axis in the bearing 59 it adjusts itself to turning of the harrow at corners or on curves.

The supports 28 are provided on each of the angle irons 32, 33 and 35 and are suitably braced as indicated at 29a on Figure 1. The shafts 21 and 22 may be turned in the supports 29 by a suitable mechanism to change the elevation of the teeth and thus vary the depth to which they will enter the soil. This mechanism comprises a lever 62 at each end of the frame. They are pivoted at 64 to a bar 65 that is carried by two upstanding arms 66 and 67 the lower ends of which have sleeves 68 and 69 fixed on the ends of the shafts 21 and 22 by bolts 70 and 71. A ratchet segment 73 is provided on the bar 65 and the lever has a spring pawl mechanism 74 for engaging the teeth of the segment to hold the lever in adjusted position. A hand lever 75 is provided for releasing the pawl. The shafts 21 and 22 are divided at the center so that one lever 62 may be operated independently of the other. Figure 16 of the drawings illustrates the manner of connecting the two halves of the hollow shafts. A freely turning stub shaft 63 is carried by the supporting bar 28—29 that is bolted to the center angle irons 34 and 35. The ends of the shaft 21 fit over the stub shaft. Two pins 72 are welded in the two sections of the shaft 21 to prevent the stub shaft from being displaced.

Figure 3 and the detailed Figures 11 to 14 inclusive show how a number of the spring harrow units may be coupled together to a tractor so that they may be operated together. In Figure 3 four of the frames 27 are shown coupled together and to a tractor 76. The angle irons 40 and 41 of each of the frames have hitching loops 78 mounted thereon to receive a traction cable 77. Figures 11 and 12 illustrate the construction and mounting of the hitching loops 78. The loop is bent to the proper shape and flattened at its ends and apertured to receive a bolt 79 which passes through the depending flange of the angle iron. The adjacent loops of adjoining frames are linked together by bars 80. Each bar 80 has a collar 81 at each end pressed tightly thereon. The collar carries a loop 82 integral with the collar and this loop is threaded into the hitching loop 78. This connection allows adequate play for accommodation of the several units to uneven ground conditions and yet it prevents them from getting too close or too far apart. The wheels, being set in a substantial distance from the ends of the frames, do not interfere with placing the frames close together so as to avoid missing strips.

In utilizing any harrow upon weedy or trashy soil difficulty is encountered because of the accumulation of the trash upon the harrow teeth or upon the lower frame parts that engage the ground. Our wheeled harrow practically avoids this difficulty. The low nose or forward frame piece 39 is at least as low as the wheel axles and the shafts 21 and 22 to give a draft and keep the rear teeth down. The draft exerts a leverage to pull the back end down and keep the rear wheel on the ground in hard ground. The dropped front of the frame also permits the use of a smaller wheel that can be set closer to the teeth in the front row and thus reduce the overall front to back dimension of the machine so it can more readily follow the ground contour in crossing low spots or humps. The teeth do not have adjacent frame members near the curved parts thereof to block the trash from passing between them. In addition we provide means to wipe the trash downwardly and rearwardly between the teeth. Even very bad trashy conditions are thus overcome.

The trash wiping means comprises two shafts 83 and 84 mounted on top of the frame 27 above and to the rear of the tooth mounting. The end pieces 32 and 33 have extension bars 85 and 86 bolted thereon and these bars are braced underneath by braces 87 which are bolted to the flanges of the end pieces. There are bearings 88, 89, 90 and 91 on the bars 85 and 86 for the shafts 83 and 84. Also the center angle irons 34 and 35 have bearings 92 and 93 thereon for the shafts 83 and 84.

The shafts 83 and 84 carry curved, two pronged forks 94. Figures 7 to 9 of the drawings show how these forks, which are preferably somewhat resilient are mounted on the rods by two clamping blocks 95 and 96, two bolts 97 and 98 and two washers 99 and 100. The shafts are rotated by means of a chain drive from a sprocket wheel 101 on the shaft 51, a chain 102, two sprocket wheels 103 and 104 on the shaft 83, a chain 105, and a sprocket wheel 106 on the shaft 84. The direction of rotation of the forks is illustrated by the arrows in Figure 1. The forks are positioned between the spring teeth of the harrow and are spaced angularly about their shafts so that adjacent forks pass between the harrow teeth at different times. This is most effective in removing the trash. It will be noted that the forks curve in a direction opposite to the direction of rotaton of the shafts so that they tend to push the trash downwardly into engagement with the ground.

The construction just described has many advantages in operation and use by the farmer. The construction is such that the spacing of the teeth can be varied to suit the individual needs. For example in weeding it is desirable to have teeth rather closely spaced and set shallow. For working the soil a greater depth is required and it is not necessary to use the teeth so close together. The spacing is easily changed by loosening the bolts that clamp the blocks 23 and 24 to the shafts. The entire tooth assembly can be removed from the frame by removing the bolts 30 and 31 and thus freeing the bars 22 from the frame and removing the end sleeves 69. The depth of the teeth can be set to suit any desired requirements. As shown in Figure 1 the setting of the frame on the wheels is for deep penetration of the teeth. The levers 62 are used to lower the teeth into the soil. The frame can easily be raised on the front wheels by means of the plates 49a, 50a, 53a and 54a and the extra mounting holes provided in these plates. The rear end of the frame is adjusted by raising and lowering the collar 61 on the stem 53 that is carried by the wheel 57. This enables the machine to be set to the right elevation to bring the teeth to the proper angle for penetration of the soil, for the particular work to be done.

The wheeled construction is particularly advantageous as constructed. In crossing low spots or valleys in a field or in going lengthwise of the field the fact that the rear wheel is at the center line of the frame and close to the rear teeth, and the setting of the front wheels inwardly substantially from the side edges make it possible for the teeth to reach the lowest ground levels whether the valley be crossed at an angle or be followed. In using the several units together as shown in Figure 3 the spreader bars allow each unit to adapt itself to the contour of the ground.

The fact that the entire framework is clear of the ground is particularly advantageous in the destruction of quack grass and similar weed growths. These weeds are turned over by the teeth and cannot wedge between the teeth and runners as they do in the ordinary runner supported spring tooth harrow. There are no parts sliding on the ground to wear out in gravelly soil. Also when the teeth encounter hard patches of soil like the "hard pan" patches found in this area they stay in the ground much better than the teeth of the ordinary spring tooth harrow.

The harrow teeth can be lifted clear of the ground by the levers for movement across fields where the teeth should not disturb the surface. Also when the machine is to move along a highway it is not necessary to load it on to another vehicle. To arrange the units for moving the hitching loops 78 are removed by taking out the bolts 79. This releases the spreader bars. Then the units are lined up in tandem and the wheels 57 are raised up on three of the units and set upon the front ends of the angle irons 34 and 35 behind the front angle iron 39 of the next adjacent unit. They are fastened down by chain or other securing means. The wheel 57 on the fourth unit is removed by taking off the upper collar thereon and a shaft having a hitching loop or clevis thereon is placed in the bearing. The clevis is secured to the tractor or a truck at a high enough level to keep the teeth clear of the ground. The several units can thus be moved along a highway without difficulty.

In operating a series of units abreast as shown in Figure 3 the front wheels make it unnecessary to use a hitching cart or draw bar. The spreader bars and the cables are all that is necessary to hitch the units to a tractor. The sections stay in line better than the ordinary spring tooth sections do with a hitching cart.

The saving in power necessary to pull our improved harrow, when compared to the ordinary spring tooth harrow, is particularly noticeable. The same power unit can pull at least 30% more width of harrow of our type than it can of the usual type. This effects a considerable saving in the working of the soil.

It is believed to be evident, from the foregoing description, that we have provided a novel spring tooth harrow construction wherein the desired objects set forth at the beginning of the specification are accomplished. The particular three wheeled mounting of the harrow has the advantage of enabling it to follow the ground contour quite closely. Since the only ground engaging parts, other than the teeth, are the wheels, the power necessary to pull the harrow is low. The tendency to clog with trash is also low, and, the variation in depth to which the teeth sink between hard soil and soft soil is kept at a minimum. The trash removing forks are capable of clearing the teeth in the worst trash conditions. The teeth and the forks are readily adjustable in spacing and replaceable. The whole fork driving mechanism is easily removed whenever it is not needed.

While a preferred form of the invention has been shown and described it is evident that many modifications may be made in the several parts within the scope of the invention. Having described in detail one form of our invention, we claim:

1. A spring tooth harrow comprising a frame, wheels supporting the frame, tooth carrying shafts suspended from the frame, spring teeth carried by the shafts, trash removing members rotatably mounted on the frame in position to rotate between the teeth and means connecting one of the wheels to the members whereby to rotate the trash removing members as the wheel rolls, said connecting means comprising shafts carrying said members and journalled in the frame, sprocket wheels on the shafts and said wheel and sprocket chains connecting said sprocket wheels.

2. A spring tooth harrow comprising a frame, wheels supporting the frame, tooth carrying shafts suspended from the frame, spring teeth carried by the shafts, trash removing members rotatably mounted on the frame in position to rotate between the teeth and means connecting one of the wheels to the members whereby to rotate the trash removing members as the wheel rolls, said connecting means comprising shafts carrying said members and journalled in the frame and means drivingly connecting the shafts to said wheel, the members comprising forks curved rearwardly with respect to the direction of their rotation at their free ends.

3. A spring tooth harrow comprising a frame, a row of spring teeth carried by the frame, trash removing members rotatably mounted on the frame operable to rotate between the spring teeth, the trash removing members comprising forks, a shaft journalled in the frame above and rearwardly of the teeth, the forks being fixed on the shaft, adjacent forks being angularly offset on said shaft so that the forks on opposite sides of each tooth pass the tooth at different times, and means to rotate the fork carrying shaft.

CLARENCE A. GOOLEY.
EDWARD L. GOOLEY.

REFERENCES CITED

The following references are of record in the file of this patent:

UNITED STATES PATENTS

| Number | Name | Date |
|---|---|---|
| 441,981 | Pehrson | Dec. 2, 1890 |
| 741,076 | Sheppard | Oct. 13, 1903 |
| 796,386 | Wolcott | Aug. 1, 1905 |
| 894,914 | Stookey et al. | Aug. 4, 1908 |
| 1,214,961 | Sharp | Feb. 6, 1917 |
| 1,263,423 | Johnson | Apr. 23, 1918 |
| 1,549,388 | Silverthorne | Aug. 11, 1925 |
| 1,564,333 | Engle | Dec. 8, 1925 |
| 1,776,693 | Koch | Sept. 23, 1930 |
| 1,824,603 | Kovar et al. | Sept. 22, 1931 |
| 1,843,275 | Furrer | Feb. 2, 1932 |
| 1,969,684 | Bird | Aug. 7, 1934 |
| 2,501,364 | Traver | Mar. 21, 1950 |